3,502,398
Patented Mar. 24, 1970

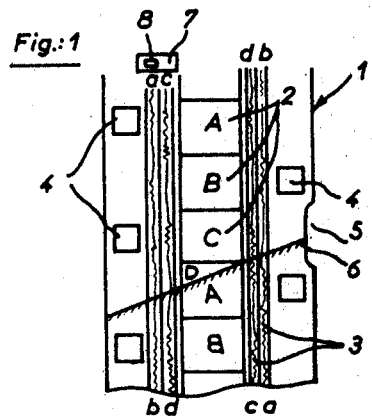
Fig.:1
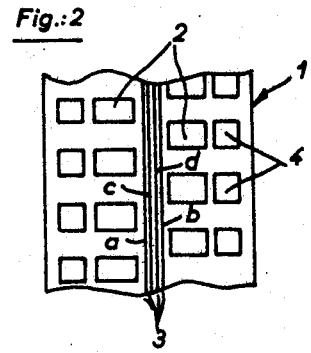
Fig.:2
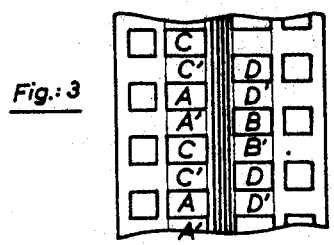
Fig.:3
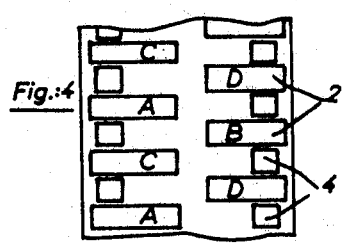
Fig.:4
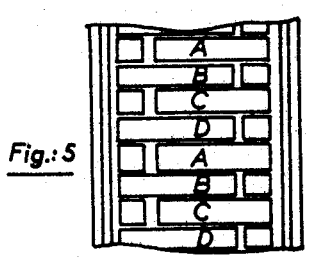
Fig.:5
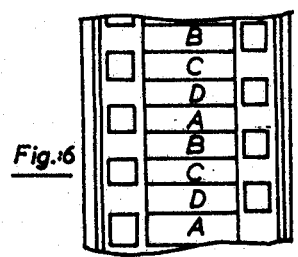
Fig.:6
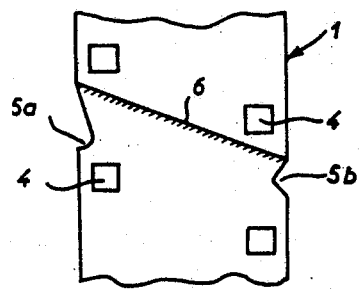
Fig.:7
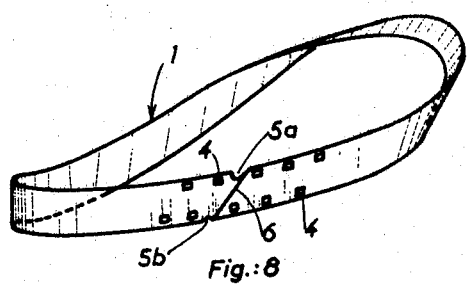
Fig.:8

3,502,398
SOUND FILM
Charles Michelson, Paris, France, assignor to Teverama S.A., Lausanne, Vaud, Switzerland, a company of Switzerland
Filed Aug. 3, 1966, Ser. No. 570,027
Claims priority, application France, Aug. 9, 1965, 27,719
Int. Cl. G03b 31/00; G03c 1/76
U.S. Cl. 352—37
2 Claims

ABSTRACT OF THE DISCLOSURE

An endless cinematograph sound film formed into a Moebius band and bearing one or more rows of interlocked images belonging to different sequences. The images to be successively projected are separated by an interval comprising at least one image of another sequence. Corresponding sound tracks are provided for the different sequences. Two longitudinally extending rows of perforations extend along opposite edges of the film, one row of perforations being staggered with respect to the other row. The sound tracks and the perforation rows are symmetrically distributed about the longitudinal axis of the film.

---

The present invention relates to an endless sound film of the type comprising firstly alternating cinematographic images distributed in such a way that the images belonging to one sequence and intended to be successively projected are not adjacent, but are separated by a space containing one or more images belonging to one or more different sequences, and secondly juxtaposed sound tracks corresponding respectively to the said image sequences and in which the recorded sound signals relating to one image occupy a length of film equal to that of the image pitch or spacing between two successive images of the same sequence. Such an endless sound film having multiple sequences is described in applicant's U.S. patent application Ser. No. 475,204 having a common assignee with the present application and now abandoned.

The use of such a film in a projection apparatus involves a switching of the images and sound tracks with each revolution of the film and also a control of the switching operations at the place where the start of the film is stuck or welded to the end of the latter. The instant of the switching operation is brought about on the film by an indentation, perforation, metallisation or any other local modification of the film, which is capable of directly or indirectly causing the two switching operations in question.

These switching or change-over operations on the images and sound tracks with each complete revolution of the endless film must be effected simultaneously with a high degree of precision by means of relatively complicated and troublesome control devices which act both on the image projection system and on the sound pick-up system.

It has already been proposed to simplify the design of the projector by making superfluous the device for changing the image sequence by a very simple expedient, which consists in having on the endless film a total number of images which is incommensurable with the number of sequences, so as to permit a continuous projection which uses up all the images without repetition, after a number of complete revolutions in unwinding the endless film which is equal to the said number of sequences, as described in French Patent No. 1,372,015 of Aug. 1, 1963.

The present invention concerns a film of the same type, but to which has been added an improvement which has the effect of still further simplifying the projector by possibly permitting the change-over device for the sound track to be dispensed with.

According to this improvement, the endless film has two lateral rows of alternating or staggered perforations, that is to say, the perforations of one of the rows are off-set with respect to those of the other row, preferably by half the pitch of the perforations, such a film with alternate perforations being advantageously formed as a loop with recto-verso reversal in the manner of a Moebius band, the sound tracks being arranged symmetrically in respect of the axis of the film.

In the accompanying drawings:

FIGURE 1 is a fragmentary diagrammatic view of an endless film according to the present invention, showing the connection of the two ends of the film and the arrangement of the perforations.

FIGURES 2 to 6 show modifications of the arrangement.

FIGURE 7 is a view showing another arrangement of indentations.

FIGURE 8 is a perspective view of a film in the form of a Moebius band.

FIGURE 1 shows an 8 mm. endless film 1 comprising alternating images 2 belonging to four sequences A, B, C, D, to which correspond the sound tracks 3, shown at a, b, c, d, respectively. The general arrangement is symmetrical with respect to the film axis, except for the perforations 4, which are distributed along two laterally spaced, longitudinally extending rows which are arranged in staggered manner, the off-setting of the perforations of one row with respect to those of the other row being equal to half the pitch or spacing of two successive perforations.

It will be observed that this alternation in the perforations has the effect of reducing the fragility of the film by avoiding perforations being too close to one another. It is true that the duplication of the row of perforations by comparison with a film of the same format with a single lateral row of perforations leads to a smaller image. However, this arrangement does on the other hand permit a partial automatic change-over of the tracks. In order to achieve this result, it is necessary to splice the film front to back, thus providing a Moebius band (see FIG. 8) being reversed with each revolution.

On projection, one image of every two is reversed. The images A and C are the right way round and the images B and D are inverted. The change-over or transition from the sequence A to B is effected as previously indicated by eliminating or adding a sequence-ending image, but the track b succeeds the track a without any switching operation. The only mechanical operation to be carried out will be the relative shifting of the film and track scanning device from left to right by one track width in order to pass from the tracks a and b to the tracks c and d. The displacement is so small (0.7 mm. in the example chosen) that an indentation in the film, such as 5, at the position of the splice 6 can control this displacement once in every two revolutions, once in one direction and once in the other direction. The controlled element may be the assembly comprising the light source and cell, or more simply a very light movable diaphragm 7 placed in front of the light source and having a slot 8.

The dimensions of the iamge, as pointed out, have been appreciably reduced because of the presence of a second row of perforations 4. In order to re-establish the dimensions, it would for example be possible to adopt a half pitch (2.11 mm. instead of 4.23 mm.), which would give the very appreciable additional advantage of not requiring any change-over of the sound tracks, these latter being reduced to two.

The use of a 16 mm. film with a double row of perforations makes it possible to avoid losing the space reserved for the second row of perforations. The sound tracks 3 can then be placed along the axis of the film (see FIGURE 2).

Nevertheless, this solution leads to a loss of surface between the successive images 2. By means of a manual change-over, it would be possible to use the free spaces A′ B′ C′ D′ etc. (see FIGURE 3) by arranging supplementary images therein. The same arrangement is also applicable to a normal film. The feed device is then provided with an arrangement which shifts the film by the height of one image each time it is reversed, that is to say, one time out of two.

FIGURE 4 shows a modification with an arrangement of the images 2 between perforations 4.

If the sound tracks are positioned between the perforations and the edge of the film, there is obtained the solution shown in FIGURE 5, which permits a very large image, which is however necessarily anamorphosised in the vertical direction. FIGURE 6 shows a similar solution, the space between perforations not being used. It is in fact known that this part of the film is frequently damaged by the action of the claws, as a result of an error in loading the film in the projector.

It has been pointed out above that a single indentation in the film placed at the position of the splice would permit the control of the displacement of the sound head relatively to the track, provided that the control is effected by a movement in one direction with one of the change-over operations and by a movement in the opposite direction with the following change-over. An interesting modification consists in cutting a notch or indentation 5a, 5b on each edge of the film in the region of the splice 6 (FIGURE 7). Under these conditions, the right indentation 5b directly controls the movement towards the right, while the left indentation 5a directly controls the movement towards the left. On the other hand, it is essential that the control is only possible one time out of two, and this is easy to achieve, either by giving different shapes to the indentations, as shown in FIGURE 7, or by driving a cam or ratchet of suitable shape.

What I claim is:

1. A cinematograph sound film bearing at least one longitudinal row of interlocked images belonging to different sequences with the images to be successively projected being longitudinally separated by a space which includes at least one image of another sequence and sound tracks corresponding respectively to said sequences and distributed substantially symmetrically about the longitudinal axis of said film, wherein the improvement comprises two laterally spaced, longitudinally extending rows of perforations of the same pitch, said rows being positioned substantially symmetrically about said longitudinal axis and the perforations of one row being staggered relatively to those of the other row, said film being formed into an endless Moebius band, whereby said perforation rows register with one another.

2. A film as claimed in claim 1, wherein the stagger of the perforations of said rows is equal to half said pitch.

References Cited

UNITED STATES PATENTS

| | | | |
|---|---|---|---|
| 1,255,338 | 2/1918 | Rearick | 352—241 |
| 2,215,502 | 9/1940 | Harper | 352—37 |

FOREIGN PATENTS

| | | |
|---|---|---|
| 621,470 | | Italy. |
| 60,207 | 2/1926 | Sweden. |

NORTON ANSHER, Primary Examiner

MONROE H. HAYES, Assistant Examiner

U.S. Cl. X.R.

352—239, 241